(12) United States Patent
Varshavsky et al.

(10) Patent No.: US 9,197,636 B2
(45) Date of Patent: *Nov. 24, 2015

(54) DEVICES, SYSTEMS AND METHODS FOR SECURITY USING MAGNETIC FIELD BASED IDENTIFICATION

(71) Applicant: AT&T Intellectual Property I, L.P., Atlanta, GA (US)

(72) Inventors: Alexander Varshavsky, East Hanover, NJ (US); Kevin Ansia Li, Chatham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,400

(22) Filed: Jun. 9, 2014

(65) Prior Publication Data

US 2014/0289835 A1    Sep. 25, 2014

Related U.S. Application Data

(63) Continuation of application No. 13/180,805, filed on Jul. 12, 2011, now Pat. No. 8,752,200.

(51) Int. Cl.
*G06F 21/44*      (2013.01)
*H04L 29/06*      (2006.01)
*H04L 9/32*       (2006.01)
(Continued)

(52) U.S. Cl.
CPC ............ *H04L 63/0861* (2013.01); *G06F 21/32* (2013.01); *G06F 21/44* (2013.01); *H04L 9/3231* (2013.01); *H04L 9/3247* (2013.01); *H04W 12/06* (2013.01); *G06F 2221/2111* (2013.01); *H04L 2209/805* (2013.01)

(58) Field of Classification Search
CPC . H04L 9/3231; H04L 2463/102; G06F 21/31; G06K 7/10
See application file for complete search history.

(56) References Cited

U.S. PATENT DOCUMENTS

| 5,142,655 A | 8/1992 | Drumm |
| 5,317,317 A | 5/1994 | Billaud et al. |

(Continued)

OTHER PUBLICATIONS

"MagiTact: Interaction with Mobile Devices Based on Compass(Magnetic) Sensor," Ketabdar et al., ACM Feb. 1-10, 2010.

(Continued)

*Primary Examiner* — Venkat Perungavoor
(74) *Attorney, Agent, or Firm* — Hartman & Citrin LLC

(57) ABSTRACT

Devices, systems and methods are disclosed for determining an electromagnetic signature for authenticating a device, a user, and/or a location. In exemplary embodiments, a magnetometer captures an electromagnetic signature which is then compared with one or more authorized electromagnetic signatures. If the electromagnetic signature matches an authorized electromagnetic signature, then access is granted. The magnetometer is integrated into a communication device having a processor and a logic. The magnetometer captures an electromagnetic signature of a surrounding environment and detects motion of the communication device through the captured electromagnetic signature. The logic on the communication device locks or unlocks features of the device based upon the captured electromagnetic signature. In further embodiments of the subject disclosure, the magnetometer is in communication with a server which authenticates a user or communication device to provide access to a remote location.

20 Claims, 16 Drawing Sheets

(51) Int. Cl.
*H04W 12/06* (2009.01)
*G06F 21/32* (2013.01)
*G06F 21/35* (2013.01)

(56) References Cited

U.S. PATENT DOCUMENTS

| | | | |
|---|---|---|---|
| 5,426,666 | A | 6/1995 | Kato |
| 5,523,746 | A | 6/1996 | Gallagher |
| 5,554,980 | A | 9/1996 | Hashimoto et al. |
| 5,574,964 | A | 11/1996 | Hamlin |
| 5,726,645 | A | 3/1998 | Kamon et al. |
| 5,727,553 | A | 3/1998 | Saad |
| 5,734,371 | A | 3/1998 | Kaplan |
| 5,974,236 | A | 10/1999 | Sherman |
| 6,006,089 | A | 12/1999 | Sasaki et al. |
| 6,101,428 | A | 8/2000 | Snyder |
| 6,256,476 | B1 | 7/2001 | Beamish et al. |
| 6,307,952 | B1 | 10/2001 | Dietz |
| 6,314,127 | B1 | 11/2001 | Lynch et al. |
| 6,316,710 | B1 | 11/2001 | Lindemann |
| 6,317,028 | B1 | 11/2001 | Valiulis |
| 6,380,642 | B1 | 4/2002 | Buchner |
| 6,636,763 | B1 | 10/2003 | Junker et al. |
| 6,928,342 | B2 | 8/2005 | Horst |
| 6,952,198 | B2 | 10/2005 | Hansen |
| 7,005,959 | B2 | 2/2006 | Amagasa |
| 7,046,119 | B2 | 5/2006 | Ghabra et al. |
| 7,116,988 | B2 | 10/2006 | Dietrich et al. |
| 7,151,435 | B2 | 12/2006 | Brackett et al. |
| 7,173,604 | B2 | 2/2007 | Marvit et al. |
| 7,176,886 | B2 | 2/2007 | Marvit et al. |
| 7,180,501 | B2 | 2/2007 | Marvit et al. |
| 7,180,502 | B2 | 2/2007 | Marvit et al. |
| 7,224,980 | B2 | 5/2007 | Hara |
| RE39,677 | E | 6/2007 | Bustamante et al. |
| 7,248,151 | B2 | 7/2007 | McCall |
| 7,289,025 | B2 | 10/2007 | Perez-Garcia et al. |
| 7,365,736 | B2 | 4/2008 | Marvit et al. |
| 7,411,506 | B2 | 8/2008 | Volpi et al. |
| 7,492,367 | B2 | 2/2009 | Mahajan et al. |
| 7,570,167 | B2 | 8/2009 | Fein et al. |
| 7,594,611 | B1 | 9/2009 | Arrington, III |
| 7,596,767 | B2 | 9/2009 | Wilson |
| 7,657,763 | B2 | 2/2010 | Nelson et al. |
| 7,698,002 | B2 | 4/2010 | Music et al. |
| 7,868,874 | B2 | 1/2011 | Reynolds |
| 7,907,838 | B2 | 3/2011 | Nasiri |
| 8,736,420 | B2 | 5/2014 | Aaron |
| 2001/0043145 | A1 | 11/2001 | Jacobson, Jr. |
| 2002/0016673 | A1 | 2/2002 | Flick |
| 2002/0024422 | A1 | 2/2002 | Turner et al. |
| 2002/0024427 | A1 | 2/2002 | Banas |
| 2002/0089412 | A1* | 7/2002 | Heger et al. ............... 340/5.82 |
| 2003/0023435 | A1 | 1/2003 | Josephon |
| 2003/0132974 | A1 | 7/2003 | Bodin |
| 2004/0068409 | A1 | 4/2004 | Tanaka et al. |
| 2004/0110481 | A1 | 6/2004 | Navsariwala |
| 2004/0155792 | A1 | 8/2004 | Joyner et al. |
| 2004/0164875 | A1 | 8/2004 | Dischert |
| 2005/0024228 | A1 | 2/2005 | Vignon et al. |
| 2005/0110639 | A1 | 5/2005 | Puzio et al. |
| 2005/0125837 | A1 | 6/2005 | Farmer et al. |
| 2005/0212767 | A1 | 9/2005 | Marvit et al. |
| 2005/0225453 | A1 | 10/2005 | Chang |
| 2005/0237295 | A1 | 10/2005 | Anderson |
| 2005/0258936 | A1 | 11/2005 | Ghabra et al. |
| 2006/0019679 | A1 | 1/2006 | Rappaport et al. |
| 2006/0071753 | A1 | 4/2006 | Lamar |
| 2006/0091997 | A1 | 5/2006 | Conner et al. |
| 2006/0092040 | A1 | 5/2006 | Fishkin |
| 2006/0103503 | A1 | 5/2006 | Rodriguez |
| 2006/0187196 | A1 | 8/2006 | Underkoffler |
| 2006/0235805 | A1 | 10/2006 | Peng et al. |
| 2006/0246841 | A1 | 11/2006 | Dennis et al. |
| 2006/0271214 | A1 | 11/2006 | Brown |
| 2007/0046832 | A1 | 3/2007 | Kim |
| 2007/0146118 | A1 | 6/2007 | Rodriguez et al. |
| 2007/0279241 | A1 | 12/2007 | Jung et al. |
| 2008/0005351 | A1 | 1/2008 | Neugebauer et al. |
| 2008/0065235 | A1 | 3/2008 | Igoe et al. |
| 2008/0114615 | A1 | 5/2008 | Mahesh et al. |
| 2008/0169929 | A1 | 7/2008 | Albertson et al. |
| 2008/0170776 | A1* | 7/2008 | Albertson et al. ............ 382/154 |
| 2008/0209543 | A1* | 8/2008 | Aaron ............................ 726/17 |
| 2008/0273764 | A1 | 11/2008 | Scholl |
| 2009/0213134 | A1 | 8/2009 | Stephanick et al. |
| 2009/0262069 | A1* | 10/2009 | Huntington ................... 345/156 |
| 2009/0262074 | A1 | 10/2009 | Nasiri et al. |
| 2009/0296959 | A1 | 12/2009 | Bongiovi |
| 2010/0040293 | A1* | 2/2010 | Hermann et al. ............. 382/218 |
| 2010/0083373 | A1 | 4/2010 | White |
| 2010/0103092 | A1* | 4/2010 | Hsieh et al. ................... 345/156 |
| 2011/0156867 | A1* | 6/2011 | Carrizo .............. G06K 9/00167 340/5.85 |
| 2011/0175822 | A1* | 7/2011 | Poon et al. ..................... 345/173 |
| 2011/0190060 | A1* | 8/2011 | Ketabdar et al. ................ 463/37 |
| 2011/0283354 | A1 | 11/2011 | Chang et al. |
| 2011/0300831 | A1* | 12/2011 | Chin ............................. 455/411 |

OTHER PUBLICATIONS

"Addressing Insider Threat using 'Where You Are' as Fourth Factor Authentication," Choi et al., 2012.
"Gesture Signature for Ambient Intelligence Applications: A Feasibility Study," Farella et al., 2006.
"Assessing the Vulnerability of Magnetic Gestural Authentication to Video-Based Shoulder Surfing Attacks," Shirazi et al. May 5-10, 2012.
"Detrended Cross-Correlation Analysis of Biometric Signals Used in a new Authentication Method," Ursulean et al., 2009.
"Laser magnetometry in fundamental science and in biomagnetic applications," Weis et al., 2005.
"Dynamic Signature Verification using Embedded Sensors," Shastry et al, 2011 IEEE.
"Proximity-based authentication of mobile devices," Scannell et al., Intl J. Security and Networks, vol. 4, No. 1/2, 2009.
Jackson Research, Balanced High Security Magnetometer, http://www.jrmagnetics.com/security/jr2222/jr2222.php, Copyright 1999-2014.
U.S. Office Action dated Nov. 27, 2012 in U.S. Appl. No. 13/180,805.
U.S. Office Action dated May 7, 2013 in U.S. Appl. No. 13/180,805.
U.S. Office Action dated Sep. 18, 2013 in U.S. Appl. No. 13/180,805.
U.S. Notice of Allowance dated Jan. 22, 2014 in U.S. Appl. No. 13/180,805.
U.S. Appl. No. 11/699,227 Office Action mailed May 12, 2010.
U.S. Appl. No. 11/699,227 Office Action mailed Nov. 9, 2010.
U.S. Appl. No. 11/699,227 Office Action mailed Mar. 23, 2012.
U.S. Appl. No. 11/699,227 Office Action mailed Oct. 2, 2012.
U.S. Appl. No. 11/699,227 Office Action mailed Aug. 15, 2013.
U.S. Appl. No. 11/699,227 Notice of Allowance mailed Jan. 14, 2014.

* cited by examiner

DEVICES, SYSTEMS AND METHODS FOR SECURITY USING MAGNETIC FIELD BASED IDENTIFICATION

CROSS-REFERENCE TO RELATED APPLICATION

This application is a continuation of U.S. patent application Ser. No. 13/180,805, filed Jul. 12, 2011, now U.S. Pat. No. 8,752,200, which is incorporated by reference herein in its entirety.

BACKGROUND OF THE SUBJECT DISCLOSURE

1. Field of the Subject Disclosure

The present subject disclosure relates to authentication. More specifically, the present subject disclosure relates to using a magnetometer for authentication based upon an electromagnetic signature.

2. Background of the Subject Disclosure

Communication devices, such as cellular telephones, have become a common tool of everyday life. Cellular telephones are no longer simply used to place telephone calls. With the number of features available rapidly increasing, cellular telephones, often in the form of a smartphone, are now used for storing addresses, keeping a calendar, reading e-mails, drafting documents, etc. In many instances, these features require a secure environment. Thus, with this wide range of features comes an even greater need for security. For instance, e-mails or documents may be private or privileged and need to be safeguarded from unauthorized users. An unauthorized user picking up or stealing the communication device should not be able to access this private information. In many instances, the operation of the communication device should be limited to certain areas.

As more enterprises turn towards smartphones, the ability to lock or otherwise limit phones is a necessity. Currently, smartphones may be password protected through the keypad. However, users of smartphones find password locks on smartphones annoying and inconvenient. The user sets up a password consisting of a series of keystrokes which must be re-entered to later access the cellular phone. These passwords can generally be any number of characters which the user will remember. Ideally, the password is challenging enough that an unauthorized user cannot simply guess the password and gain access. A problem with using simply a keypad for password entry is the ability of others to determine the password without the user's knowledge. Someone may be able to see the user enter the password and easily be able to repeat it. Additionally, these passwords are inconvenient, as users must look directly at the keypad and press a sequence of buttons. The keys are often small with hard to read numbers or letters, and lockouts may require frequent use of the passwords. Thus, users often choose to disable such features. More of these users may choose to utilize the security mechanisms if such mechanisms were easier and more convenient.

In addition to smartphones, many other devices or systems may also benefit from using authentication. Secure facilities, safes, automobiles, networks and many others may all benefit from ensuring that only the correct user has access. Unfortunately, many forms of authentication are currently too easy to fake.

Today, devices used to capture gestures may utilize accelerometers or may capture an infrared or visual representation of the gestures. These devices can generally detect a motion being made by a user. However, these methods of capture cannot detect a particular user making them and may be copied by an unauthorized user.

What is needed is a way to authenticate a device or user using the electromagnetic spectrum. Such authentication should ensure that access is only granted to a correct user or when in a correct location.

SUMMARY OF THE SUBJECT DISCLOSURE

The present subject disclosure addresses the above-identified issues by determining an electromagnetic signature for authenticating a device, a user, and/or a location. In exemplary embodiments, a magnetometer captures an electromagnetic signature which is then compared with one or more authorized electromagnetic signatures. If the electromagnetic signature matches an authorized electromagnetic signature, then access is granted. If a mismatch occurs, i.e. if the electromagnetic signature does not match an authorized electromagnetic signature, then a plurality of remedial actions may be performed, including wiping a memory of the device. The magnetometer is integrated into a communication device having a processor and a logic. The magnetometer captures an electromagnetic signature of a surrounding environment and detects motion of the communication device through the captured electromagnetic signature. The logic on the communication device locks or unlocks features of the device based upon the captured electromagnetic signature. In further embodiments of the subject disclosure, the magnetometer is in communication with a server which authenticates a user or communication device to provide access to a remote location.

In one exemplary embodiment, the present subject disclosure is a device for authentication. The device includes a processor, a magnetometer in communication with the processor, and a memory in communication with the processor. The memory contains a security logic for detecting a detected electromagnetic signature, determining that the detected electromagnetic signature matches at least one of a plurality of authorized electromagnetic signatures, and granting authentication.

In another exemplary embodiment, the present subject disclosure is a system for authentication. The system includes a plurality of magnets creating an electromagnetic signature and a device having an integrated magnetometer. The magnetometer detects the electromagnetic signature and the device has a memory containing a plurality of authorized electromagnetic signatures. Authorization is granted when the electromagnetic signature matches an authorized electromagnetic signature from among the plurality of authorized electromagnetic signatures.

In yet another exemplary embodiment, the present subject disclosure is a method for authentication. The method includes placing a device in a magnetic field, the device having a magnetometer, detecting an electromagnetic signature, determining one of a match and a mismatch between the detected electromagnetic signature and the at least one of a plurality of authorized electromagnetic signatures, and granting authentication when a match is determined.

DETAILED DESCRIPTION OF THE SUBJECT DISCLOSURE

Figure 1:
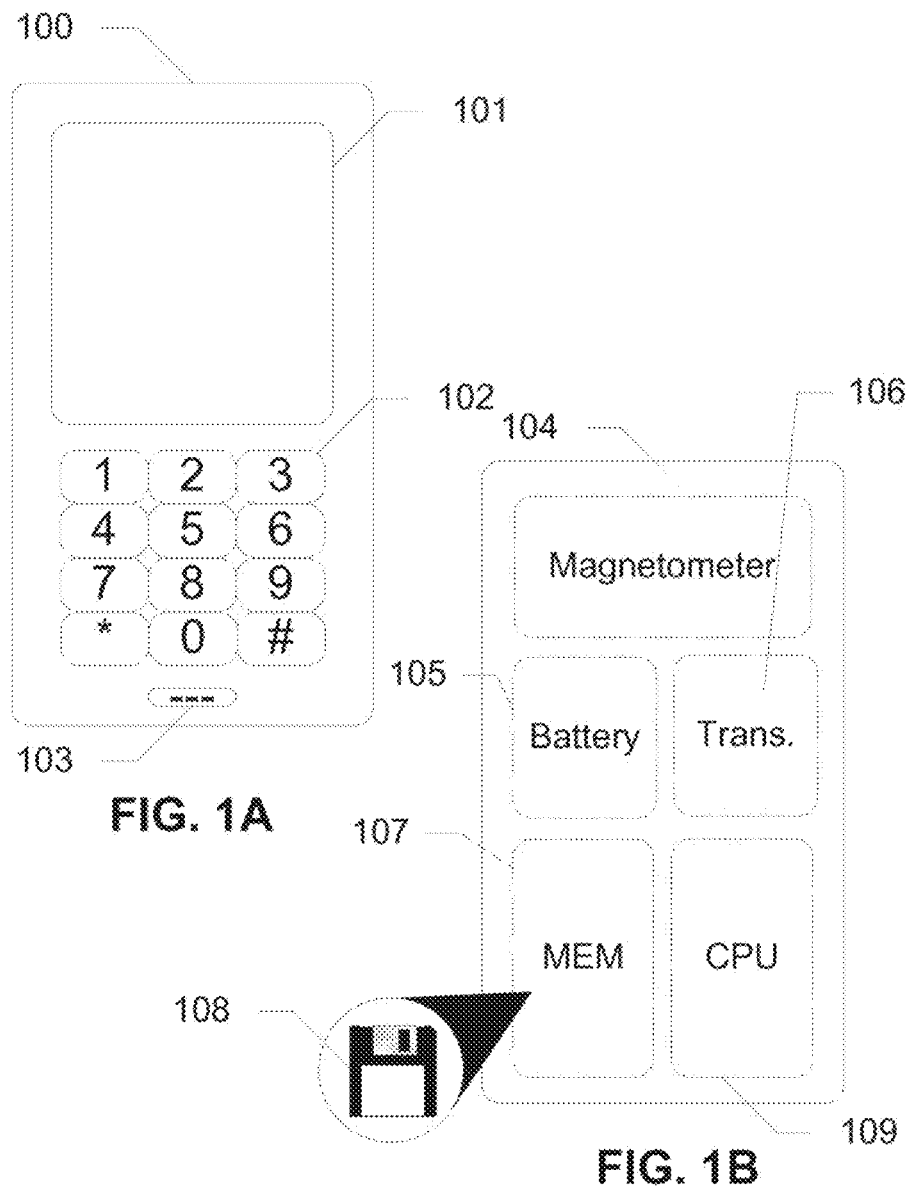
FIGS. 1A and 1B show a communication device for detecting an electromagnetic signature, according to an exemplary embodiment of the present subject disclosure.

The following detailed description discloses devices, systems, and methods for determining an electromagnetic signature for authenticating a device, a user, and/or a location. In exemplary embodiments, a magnetometer captures an electromagnetic signature which is then compared with one or more authorized electromagnetic signatures. If the electromagnetic signature matches an authorized electromagnetic signature, then access is granted. The magnetometer is integrated into a communication device having a processor and a logic. The magnetometer captures an electromagnetic signature of a surrounding environment and detects motion of the communication device through the captured electromagnetic signature. The logic on the communication device locks or unlocks features of the device based upon the captured electromagnetic signature. In further embodiments of the subject disclosure, the magnetometer is in communication with a server which authenticates a user or communication device to provide access to a remote location.

In exemplary embodiments of the subject disclosure, the magnetometer is used to unlock building electronic access control systems, unlock and start automobiles, open a safe, etc. In alternative embodiments, systems being accessed require a secondary form of authentication in order to process a user requested function such as door entry or automobile ignition. This secondary form of authentication may be a password, a biometric, a keycard, etc.

"Communication device" or "device", as used herein and throughout this disclosure, refers to any electronic device capable of sending or receiving data, and may utilize either a wired or wireless format. Many communication devices store data as well. A communication device may have a processor, a memory, a transceiver, an input, and an output. Examples of such devices include cellular telephones, personal digital assistants (PDAs), computers such as portable computers, etc. A communication device also includes smart cards, such as contactless integrated circuit cards (CICC). The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Communication devices may communicate with each other and with other elements via a network, for instance, a wireless network, or a wireline network. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of radio networks include WiFi and BLUETOOTH® networks, with communication being enabled by hardware elements called "transceivers." Communication devices may have more than one transceiver, capable of communicating over different networks. For example, a cellular telephone can include a GPRS transceiver for communicating with a cellular base station, a WiFi transceiver for communicating with a WiFi network, and a BLUETOOTH® transceiver for communicating with a BLUETOOTH® device. A network typically includes a plurality of elements that host logic for performing tasks on the network.

In modern packet-based wide-area networks, servers may be placed at several logical points on the network. Servers may further be in communication with databases and can enable communication devices to access the contents of a database. An authentication server is an example of such a server. An authentication server can include several network elements, including other servers, and may be part of a network, for example, a cellular network.

For the following description, it can be assumed that most correspondingly labeled structures across the figures (e.g., 100 and 200, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

In many embodiments of the present subject disclosure, a communication device is used to capture an electromagnetic signature. This electromagnetic signature may be of an environment, a gesture around a magnetic source, etc. The communication device may either authenticate the electromagnetic signature itself, or the authentication may be accomplished remotely, such as by an authentication server. When the electromagnetic signature is authenticated by the device, the electromagnetic signature is compared with a plurality of authorized electromagnetic signatures. These authorized electromagnetic signatures may be programmed into the device in a learning mode, sent to the device by the authentication server, programmed into the device by a second device, etc.

FIGS. 1A and 1B show a communication device 100 for detecting an electromagnetic signature, according to an exemplary embodiment of the present subject disclosure. In this embodiment, communication device 100 is a smartphone. Communication device 100 includes a magnetometer 104, which is capable of measuring a magnetic field to capture an electromagnetic signature. In exemplary embodiments of the present subject disclosure, when communication device 100 is in an authorized environment, communication device 100 is in an unlocked state, such that it may be operated by a user. Communication device 100 determines that it is located in an authorized environment by capturing an electromagnetic signature of the environment and comparing this captured electromagnetic signature with an authorized signature stored on communication device 100 or on a remote device or server in communication with communication device 100. Communication device 100 may also authenticate a user by capturing an electromagnetic signature of a nearby magnetic source as the user makes a gesture with the device. These and other uses are possible for communication device 100.

FIG. 1A shows the external components of communication device 100. Communication device 100 includes a display 101, a keypad 102, and a microphone 103. Display 101 may be a liquid crystal display (LCD), a light emitting diode display (LED), a touchscreen display, etc., and provides an output for applications stored on a memory 107 and executed by a central processing unit (CPU) 109 of communication device 100. Keypad 102 provides for an input for communication device 100. Keypad 102 may contain alphanumeric keys, shortcut keys, hotkeys, etc. Microphone 103 provides a further input for communication device 100. Microphone 103 may be used for voice calls, commands, recording, etc. An antenna (not shown) provides a means for sending and receiving signals from transceiver 106 to other devices or networks.

FIG. 1B shows the internal components of communication device 100. The internal components include a magnetometer 104, CPU 109, memory 107 storing a device logic 108, a battery 105 or other power supply, and a transceiver 106. CPU 109 controls the components of communication device 100 by executing device logic 108 from memory 107. Memory 107 stores device logic 108 as well as other data for communication device 100. Device logic 108 includes a security logic or application for communication device 100. In exemplary embodiments of the present subject disclosure, the security logic provides for authenticating a user or location for communication device 100. The security logic instructs magnetometer 104 to measure the strength and/or direction of a magnetic field. Magnetometer 104 may be a scalar magnetometer to measure the total strength of a magnetic field to which it is subjected, or a vector magnetometer which has the capability to measure the component of the magnetic field in a particular direction, relative to the spatial orientation of the device. The use of three orthogonal vector magnetometers allows the magnetic field strength, inclination, and declination to be uniquely defined. The features of magnetometer 104 may vary by embodiment and may depend upon the type of authentication to be performed. If the electromagnetic signature detected matches an authorized signature within memory 107, then the security application allows access to communication device 100 and/or applications on memory 107 of communication device 100. If a mismatch is detected, i.e. if the electromagnetic signature does not match any authorized signature from memory 107, then the security application locks communication device 100 and/or applications on communication device 100.

The security application on logic 108 can lock certain applications, specific features, or access to communication device 100 completely in the case of a mismatch. For instance, when the detected electromagnetic signature does not match an authorized electromagnetic signature from memory 107, logic 108 can lock a cellular transceiver on communication device 100, thereby rendering communication device 100 unable to connect to a cellular network. Alternatively, logic 108 can lock keypad 102 or display 101, thereby rendering communication device 100 unusable. Specific folders or files, or sensitive data stored on memory 107 can be locked as well. Other combinations will be apparent to one of ordinary skill in the art in light of this disclosure.

In embodiments of the present subject disclosure, the communication device contains several personas for a user. For instance, the communication device may have a "work" persona containing work contacts, applications used for work, files used for work, etc. The communication device may further have a "personal" persona containing contacts of family and friends, games, personal applications, etc. The communication device may be programmed such that when an electromagnetic signature of the work environment is detected, the work persona becomes active. Similarly, when the electromagnetic signature of the user's home is detected, the personal persona may be activated. Alternatively, the personal persona may become active any time the electromagnetic signature of the work environment is not detected.

While this embodiment shows the communication device as a smartphone, other devices may be similarly equipped with a magnetometer in order to provide authentication. One of ordinary skill in the art would recognize other examples of devices that would benefit from the features of the present subject disclosure. Therefore, this embodiment should not be viewed as limiting the scope of the subject disclosure.

Embodiments of the subject disclosure enable the use of a device to be constrained to a particular area. For example, a corporation may desire that employees only use a particular device in their office. Alternatively, the corporation may only want certain functions of a device, such as a laptop, to work when not in a secure location. For instance, general functions may work anywhere, but access to company files, email, etc., may be limited to within an office of the corporation. To do this, the device may be programmed to only allow access when a detected electromagnetic signal of the location of the device matches a stored authorized electromagnetic signature in the device. There may be a series of authorized electromagnetic signatures for different locations within the office.

Exemplary embodiments of the present subject disclosure further contain an input, such as a biometric scanner, within the communication device. The input provides for further authentication based upon the identity of the user or an entry. For example, an authorized electromagnetic signature may unlock the device itself while a biometric scan may further be necessary to unlock features or an application on the device. Other embodiments use inputs common to communication devices, such as a keypad to input a password, or a camera to scan a key card.

Utilizing a magnetometer in a device may provide for savings in energy consumption by the device. For example, by not requiring near field communications for embodiments of the subject disclosure, the device saves energy that would otherwise be used with these power-consuming features.

Figure 2:
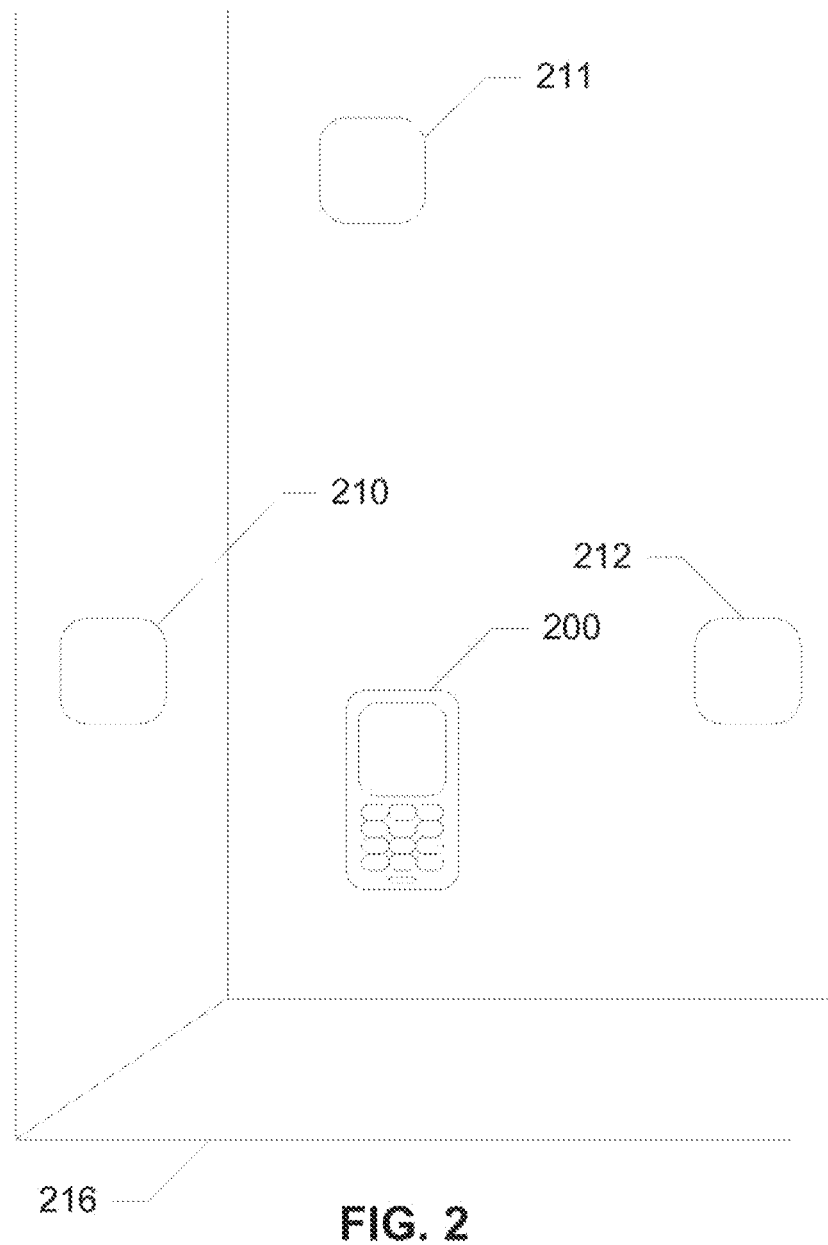
FIG. 2 shows a communication device placed in an environment, according to an exemplary embodiment of the present subject disclosure.

FIG. 2 shows a communication device 200 placed in an environment, according to an exemplary embodiment of the present subject disclosure. In this embodiment, the system includes a device 200 including a magnetometer which is located within a room 216. Permanent magnets 210, 211, and 212 may be placed into room 216 to alter the electromagnetic signature of room 216. The placement of permanent magnets 210, 211, and 212 creates a unique electromagnetic signature. Device 200 may be programmed such that this unique electromagnetic signature is required to access device 200 including programs, network access, use personas, etc. For instance, device 200 may sense the electromagnetic signature of its environment. When device 200 is located outside of an authorized environment, such as room 216, device 200 locks such that it may not be used. When device 200 is brought into room 216, and the magnetometer senses the correct electromagnetic signature, device 200 unlocks and may be used. Device 200 may then re-authenticate on a periodic basis to ensure that device 200 remains in room 216.

Permanent magnets are used in this exemplary embodiment. However, other exemplary embodiments use electromagnets driven by a server. By using electromagnets, the intensity of the magnetic field can be changed. An arrangement of electromagnets may be useful for individual offices in a building. When two people switch offices, the current through the electromagnets in their respective offices are simply swapped. Further embodiments constantly vary the current to at least one of the electromagnets to create a dynamic electromagnetic signature. Sensing a dynamic electromagnetic signature requires sensing at more than one time. In some of these embodiments, the electromagnetic signature is taken twice. Using the difference in time between takes, the whole dynamic signature is calculated and submitted to the authentication server. Dynamic signatures can be simple, such as a linear variation of a single electromagnet, or complex, such as non-linear variation of multiple electromagnets. Complexity may be limited by available bandwidth and processing power.

The authorized environment may need to be programmed into the device. This can be accomplished by placing the device in the authorized environment while the device is in a learning mode. The device detects the electromagnetic signature and stores the signature in a database on the memory of the device. Alternatively, this database is stored on a network in communication with the device. Devices that lock completely make exceptions for communicating with a network database of signatures. Multiple authorized electromagnetic signatures may be stored on the database, each with access to the same features or a different set of features. The learning mode may be activated by a network, by a code entered into the device, by another device, etc.

In embodiments of the subject disclosure, a different persona on the device activates upon the detected electromagnetic signature of the environment. For instance, when the device is a smartphone, the smartphone may have different personas for different locations. When the smartphone is at the user's work, a magnetometer in the smartphone detects the electromagnetic signature of the user's office. This is compared with a stored signature for the office. Because the signature matches, the smartphone switches to the work persona. This may allow the user to access different files, contacts, applications, etc., and may limit or expand functions of the smartphone. For instance, when in the work persona, the smartphone may prevent the user from sending any files or may require a secure network connection.

In an exemplary embodiment of the subject disclosure, a business application on a communication device may only be used in a certain location. A business application which grants access to a virtual private network is limited to devices in the office building at this certain location, while other applications, such as a notepad, may be used at any location. Thus, a notepad application on a laptop can be accessed by a user from home while the laptop is at home. However, if the user tries to access the business application, the business application will not open because the electromagnetic signature at home does not match the stored authorized electromagnetic signature for the office building. When at the office building with the laptop, the magnetometer detects the electromagnetic signature of a specific office within the office building and the user is allowed to access the business application. Logic on the laptop may constantly monitor whether the electromagnetic signature detected remains an authorized electromagnetic signature. Thus, if the user is accessing the business application while leaving the building with the laptop, the business application locks when the user leaves the building, as an authorized electromagnetic signature is no longer detected, resulting in a mismatch.

In many embodiments, authorization is performed periodically. A countdown timer sequence, based upon user-defined settings in the communication device logic, begins after an authorization, and ends just before another authorization. Once the timer expires, the device may change to an inactive and locked state that triggers a locked state. The device may be changed back into an unlocked state by authenticating the environment/user/gesture again. This feature provides the user with safeguards against the device remaining in an unlocked and user interface accessible state if the user loses control of the device or the device leaves a secure environment.

Other security functions may be triggered so that data on the communication device is properly secured when the device is outside of the secure environment for a period of time. These security functions may include, but are not limited to memory wipes, biometric locks, etc. Therefore, for example, if the device is stolen and taken out of the environment, then data that should not leave a secure environment may be erased and not used by an unauthorized user. The memory need not be wiped completely in every application. For some applications, only a portion of the memory may need purging. Additionally or alternatively, the device may further require a biometric or other secondary authentication to unlock.

Figure 3:
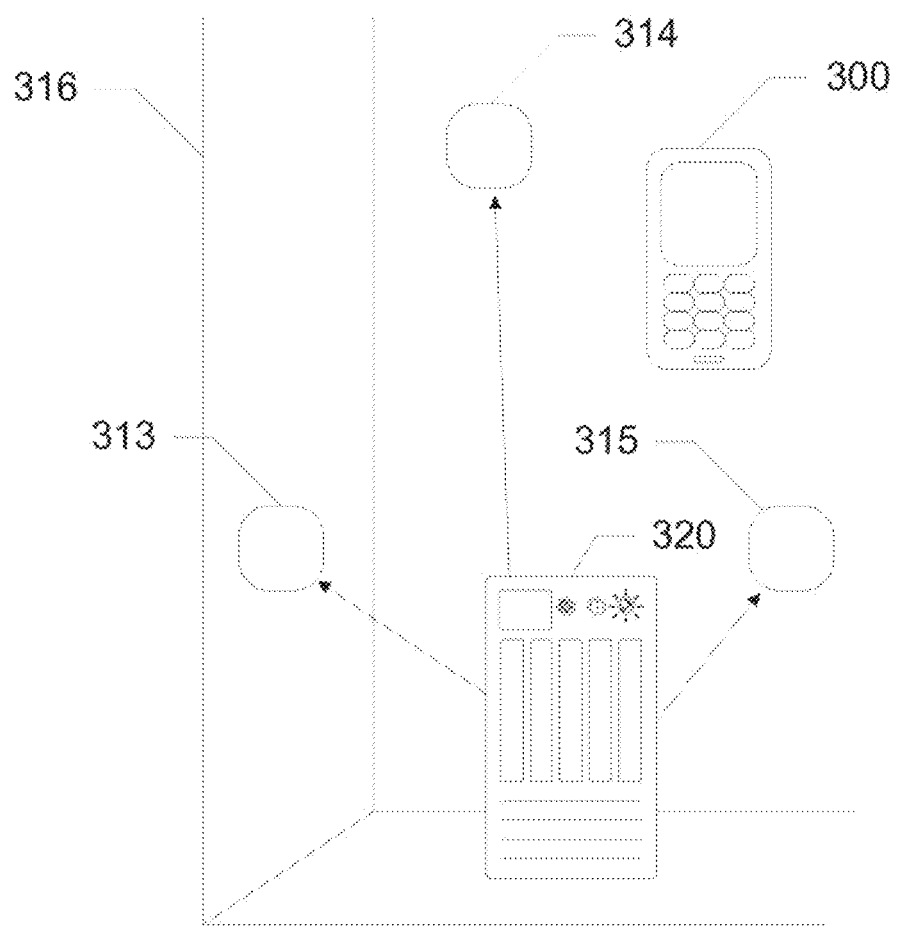
FIG. 3 shows a system for authentication utilizing magnetic fields, according to an exemplary embodiment of the present subject disclosure.

FIG. 3 shows a system for authentication utilizing magnetic fields, according to an exemplary embodiment of the present subject disclosure. In this embodiment, a series of electromagnets 313, 314, and 315 are in communication with an authentication server 320. Electromagnets 313, 314, and 315 may be a wire wound into a coil, such as a solenoid, a toroid, etc. A stronger electromagnet may be formed by placing a ferromagnetic material, such as soft iron, inside the coil. Authentication server 320 creates a magnetic field by sending an electric current through one or more of electromagnets 313, 314, and 315. Manipulating the current through electromagnets 313, 314, and 315 changes the magnetic field. Authentication server 320 sends the current to each of electromagnets 313, 314, and 315 to create a unique electromagnetic signature in an environment, such as a room 316. This electromagnetic signature may be varied by changing the current applied to electromagnets 313, 314, and 315. A device 300, such as a cellular telephone, may be within room 316. Device 300 includes a magnetometer which detects the electromagnetic signature of room 316. Device 300 compares the electromagnetic signature with a plurality of stored electromagnetic signatures located on a memory of device 300. If the electromagnetic signature matches a stored electromagnetic signature, device 300 may become unlocked or otherwise operate according to settings on the memory for the stored electromagnetic signature. According to an embodiment of the subject disclosure, authentication server 320 may change the electromagnetic signature, for example, according to the time of day. A database on the memory of device 300 may include the plurality of stored electromagnetic signatures hashed according to the time. The hash may be a global hash, based upon a global clock, may utilize RSA for public-key cryptography, etc.

In embodiments of the subject disclosure, the device 300 is also in communication with the authentication server 320. This communication may occur over near field communication, WiFi, a cellular network, a wired connection, etc. In these embodiments, the authentication server 320 may update the device 300 with the authorized electromagnetic signatures with which to match. These authorized electromagnetic signatures may change according to a time of day, a day of the week, a position of the device, etc. If the device 300 detects a variation when learning dynamic electromagnetic signatures, the device assumes a dynamic electromagnetic signature, and records as such.

Figure 4:
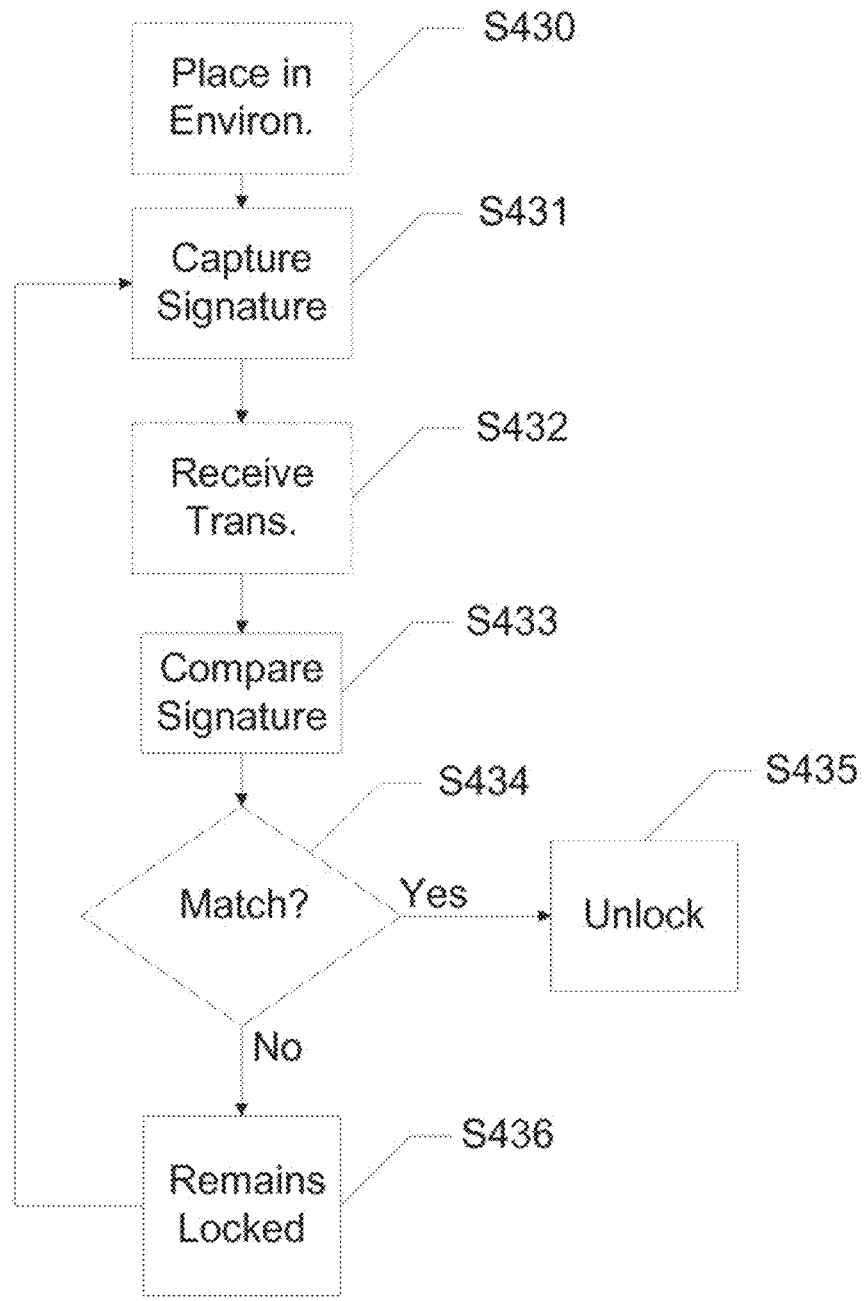
FIG. 4 shows a method of authenticating an environment for a device, according to an exemplary embodiment of the present subject disclosure.

FIG. 4 shows a method of authenticating an environment for a device, according to an exemplary embodiment of the present subject disclosure. Certain features of the device have been locked and may only be unlocked when the device is in an authorized environment. For instance, the feature may be all applications on the device, specific applications on the device, a connection to a network, a persona of the device, etc. In this embodiment, the device is equipped with a magnetometer such that it may detect and capture electromagnetic signatures. The device has either previously captured the electromagnetic signature of an authorized environment and saved the electromagnetic signature for comparison, or the device may receive a transmission detailing the electromagnetic signature of the authorized environment. The method begins when the device is placed in the environment S430. Alternatively, the device may already be located in the environment and the authentication ensures that the device is still in the environment. The device detects and captures an electromagnetic signature of the environment using the magnetometer S431. If the device does not already have the electromagnetic signatures of stored environments stored on the device, the device may receive a transmission detailing the authorized electromagnetic signatures and stores the authorized electromagnetic signatures S432. The detected electromagnetic signature is then compared with the authorized electromagnetic signatures S433. This may utilize a hash function in order to accelerate the lookup time when many different variations of electromagnetic signatures are authorized. The device determines whether the detected electromagnetic signature matches any of the stored authorized electromagnetic signatures S434. If there is a match, then at least one feature of the device is unlocked S435. If there is a mismatch, the features of the device that have been locked remain locked S436 and the device attempts to capture a new electromagnetic signature S431.

In embodiments of the subject disclosure, the logic may control the magnetometer to constantly or periodically monitor for the electromagnetic signature of an authorized environment while the application or feature is unlocked. The logic determines whether the device remains within an authorized environment. If the device remains in an authorized environment, then the application or feature remains unlocked. If the device leaves an authorized environment, then the application or feature is locked.

Figure 5:
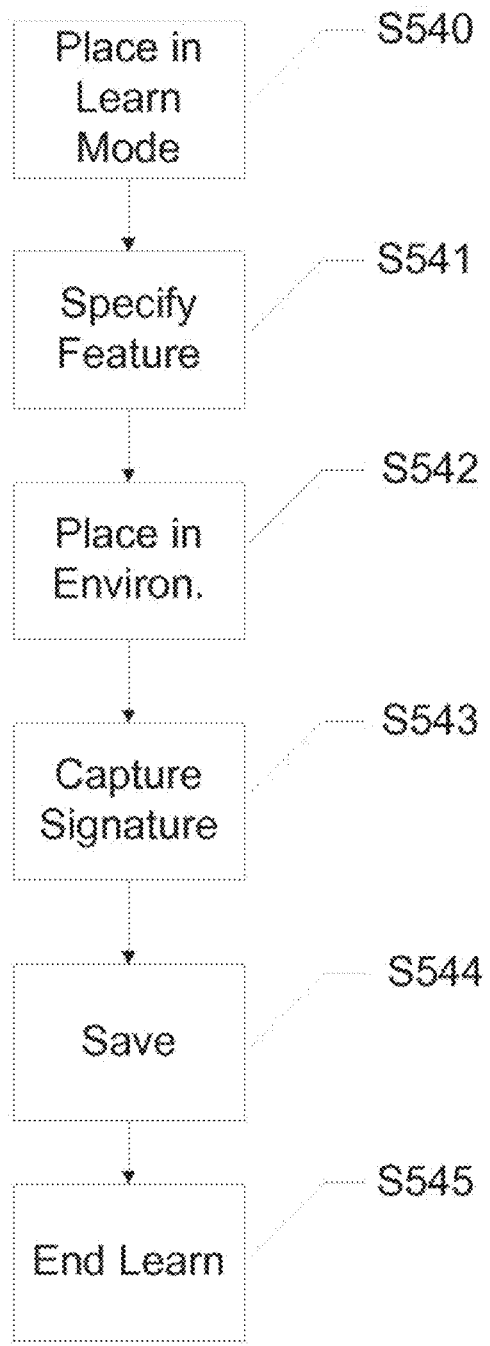
FIG. 5 shows a learning mode for a communication device, according to an exemplary embodiment of the present subject disclosure.

FIG. 5 shows a learning mode for a communication device, according to an exemplary embodiment of the present subject disclosure. The learning mode is used to set an authorized environment in which certain features of the device are allowed. This is accomplished by capturing an electromagnetic signature of the environment which is authorized in order to make a later comparison. In this embodiment, the method begins by placing the device in the learning mode S540. This may be accomplished by pressing a button, entering a password, entering a biometric of an authorized user, etc. With the device in the learning mode, the user specifies a selected feature of the device that will be allowed for the subsequently set environment S541. For instance, the user may specify that work e-mail may be accessed on the device in the authorized environment. The device is then placed in the authorized environment S542. The device captures the electromagnetic signature of the environment using a magnetometer onboard the device S543. The device then saves this electromagnetic signature and associates the electromagnetic signature with the selected feature S544. The learning process is then ended S545. For instance, the learning process may be ended by pressing a button, entering a password, a biometric, etc. or may end when the association between the electromagnetic signature and the selected feature is made. With the association made, the selected feature is accessible when the device later detects the electromagnetic signature of the authorized environment.

Figure 6:
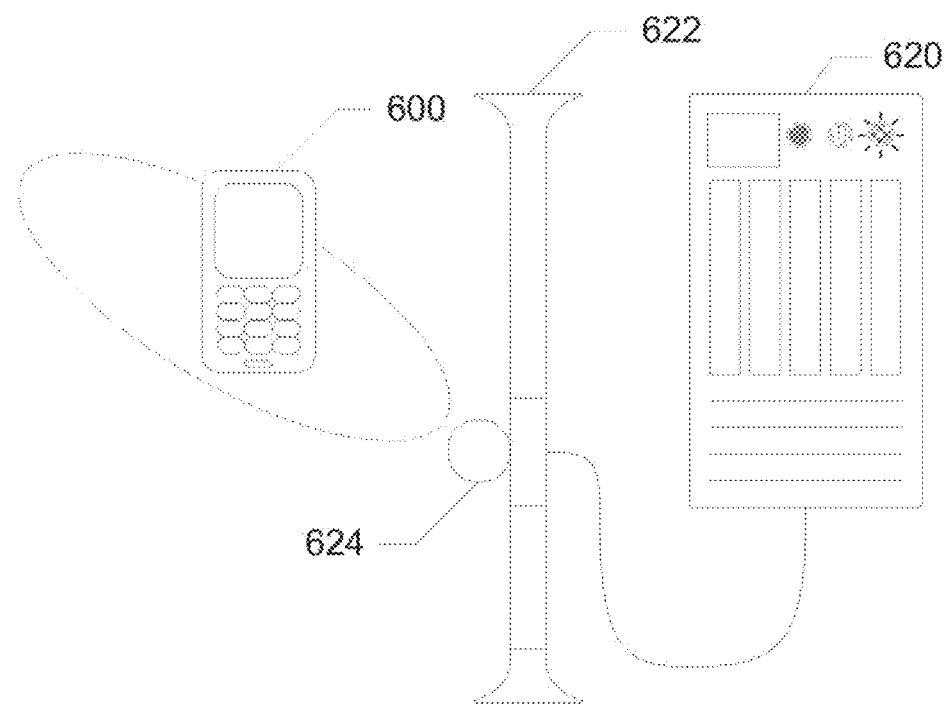
FIG. 6 shows a system for gesture based authentication, according to an exemplary embodiment of the present subject disclosure.

FIG. 6 shows a system for gesture based authentication, according to an exemplary embodiment of the present subject disclosure. In this embodiment, a communication device 600 reads an electromagnetic signature as communication device 600 is gestured around a magnetic source 624. Alternatively, communication device 600 may simply be placed in front of magnetic source 624. The system includes communication device 600, an accessible unit 622, magnetic source 624, and an authentication server 620. Communication device 600 includes a magnetometer to detect and capture an electromagnetic signature produced by magnetic source 624. Communication device 600 also contains a memory and processor to execute logic on the memory. Communication device 600 may further be gestured to create a unique electromagnetic signature. For instance, positioning communication device 600 at a certain distance from magnetic source 624 and gesturing communication device 600 in a circle produces a different electromagnetic signature read by the magnetometer than gesturing communication device 600 in a square. Magnetic source 624 may be a permanent magnet, may be an electromagnet driven by authentication server 620, etc. Accessible unit 622 may be any door, barrier, etc. that prevents access without proper authentication. For instance, accessible unit 622 may be a safe, a secure facility, a vehicle, etc. Authentication server 620 is capable of communicating with communication device 600. Authentication server 620 includes a memory containing a security logic and a processor. Authentication server 620 also communicates with accessible unit 622 to open accessible unit 622 when communication device 600 is authenticated. Authentication may be performed by either communication device 600 or authentication server 620. When authentication server 620 authenticates, communication device 600 detects an electromagnetic signature and sends the electromagnetic signature to authentication server 620. Authentication server 620 attempts to match the electromagnetic signature with authorized electromagnetic signatures saved within the memory of authentication server 620. This may require using a hash function to find the match. When authentication server 620 is driving an electromagnet, multiple variables may be needed in determining a match. If a match is found, authentication server 620 sends a signal to accessible unit 622 to grant access. If a match is not found, access is not granted. When communication device 600 authenticates, communication device 600 detects the electromagnetic signature and attempts to match the electromagnetic signature with an authorized electromagnetic signature stored within the memory of communication device 600. If a match is found, communication device 600 sends a signal to authentication server 620 which in turn signals accessible unit 622 to grant access. If a match is not found, access is not granted. Communication device 600 may prompt the user to attempt authentication again.

Figure 7:
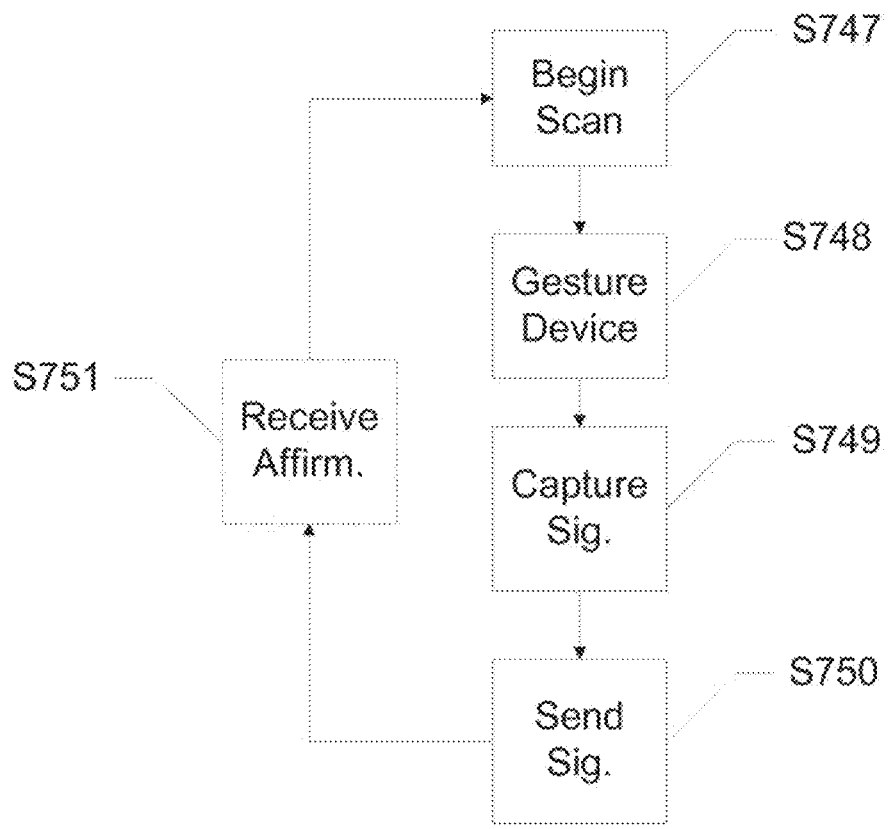
FIG. 7 shows a method of using a device to capture a gesture based authentication, according to an exemplary embodiment of the present subject disclosure.

FIG. 7 shows a method of using a device to capture a gesture based authentication, according to an exemplary embodiment of the present subject disclosure. In this embodiment, the device is being used as authentication to open or otherwise provide access to an accessible unit. This accessible unit may be a door, a second device, a network, etc. Gestures around a magnetic source are used to produce a unique electromagnetic signature which is detected by the device. The method begins when the magnetometer of the device begins scanning S747. The device may start automatically, when the device receives a communication from the accessible unit, when a proximity to the accessible unit is detected, when a location is detected, when a button is pressed, when a password is entered, when a biometric is read, etc. The device is then gestured around the magnetic source S748. As the device is gestured, the magnetometer of the device detects an electromagnetic signature S749. The device then sends the detected electromagnetic signature to the accessible unit S750. If the detected electromagnetic signature matches a stored authorized electromagnetic signature indicating a correct electromagnetic signature for access, access to the accessible unit is granted. The device may receive an affirmation of the correct electromagnetic signature S751.

Such a gesture-based authentication using a magnetometer is more secure than simply using an accelerometer. Using the electromagnetic signature allows for authentication to be double keyed. According to embodiments of the subject disclosure, both the device and the gesture must be correct for authentication. For example, drawing a circle while facing the magnetic source would produce a different electromagnetic signature than when drawing the circle while facing a different direction. When using an accelerometer, these measurements are the same. Further, a different gesture and/or orientation may be used for each day, providing more possibilities.

Figure 8:
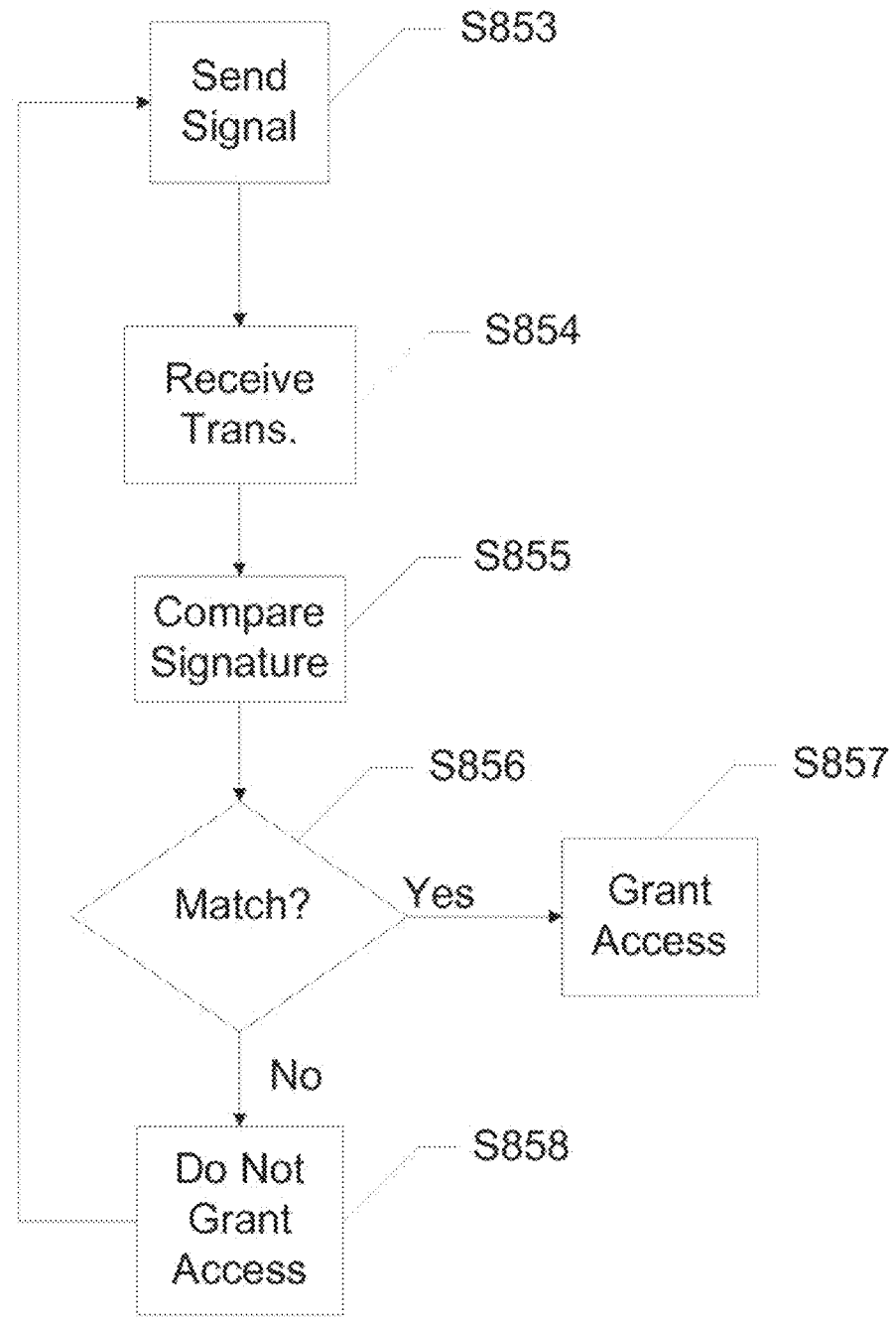
FIG. 8 shows a method of creating an electromagnetic field for authentication, according to an exemplary embodiment of the present subject disclosure.

FIG. 8 shows a method of creating an electromagnetic field for authentication, according to an exemplary embodiment of the present subject disclosure. In this embodiment, an accessible unit contains or is in proximity to a permanent magnet. The accessible unit contains or is in communication with a processor and memory which stores at least one authorized electromagnetic signature for entry, etc. In embodiments of the subject disclosure, the accessible unit has a transceiver to communicate with the device. The device may be further gestured around the magnetic source to create a unique detected electromagnetic signature. The method begins with the accessible unit sending a signal to the device S853. The signal may be a message instructing the device to begin authentication, may contain instructions for authentication, etc. After the device captures an electromagnetic signature, the accessible unit receives a transmission from the device containing the electromagnetic signature S854. The accessible unit or the authentication server compares the received electromagnetic signature with a plurality of authorized electromagnetic signatures S855. The accessible unit or authentication server then determines whether or not the received electromagnetic signature matches any of the authorized electromagnetic signatures S856. If a match is found, the accessible unit grants access S857. If a mismatch is found, the accessible unit does not grant access S858 and the method returns to sending a signal to the device S853.

Figure 9:
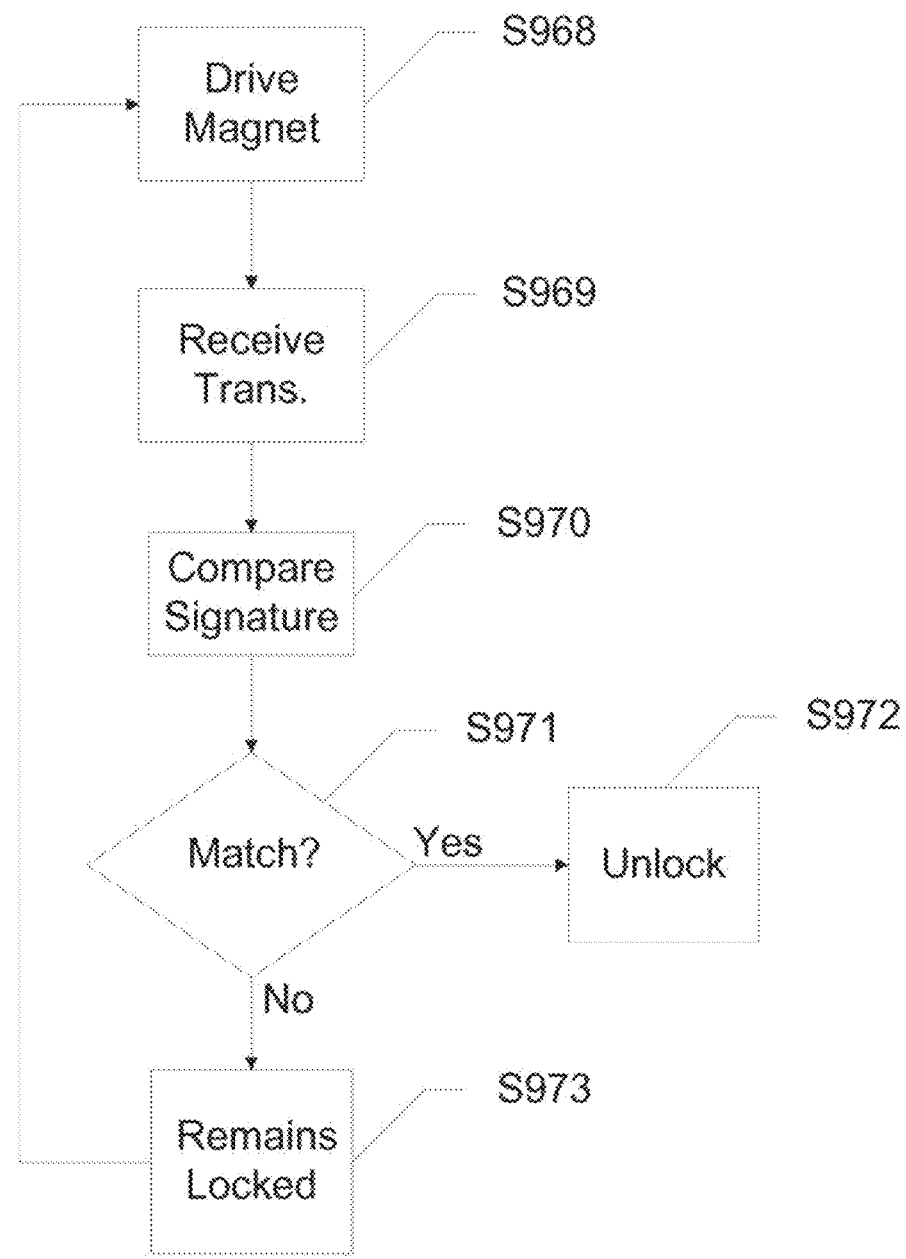
FIG. 9 shows a method of creating a variable electromagnetic field for authentication, according to an exemplary embodiment of the present subject disclosure.

FIG. 9 shows a method of creating a variable electromagnetic field for authentication, according to an exemplary embodiment of the present subject disclosure. In this embodiment, an accessible unit sends a current through an electromagnet which a magnetometer of a device detects. The accessible unit contains or is in communication with a processor and memory which stores at least one authorized electromagnetic signature for entry, logic for comparison of electromagnetic signatures, etc. The device is further gestured to create a unique detected electromagnetic signature. The method begins when the accessible unit sends a current through the electromagnet, creating a magnetic field S968. After the magnetometer of the device captures an electromagnetic signature, the accessible unit receives a transmission from the device containing the electromagnetic signature S969. Using the logic and processor, the accessible unit compares the received electromagnetic signature with an authorized electromagnetic signature S970. The accessible unit then determines whether or not the received electromagnetic signature matches the authorized electromagnetic signature S971. If the two match, the accessible unit grants access S972. If the two do not match, the accessible unit determines a mismatch, denies access S973 and the method returns to sending the current through the electromagnet S968.

As with previous embodiments, in embodiments of the subject disclosure, a failed authentication may lock the entire device, while in other embodiments other applications on the device may still be used. When the entire device is locked, a secondary authentication may further be required. In embodiments of the subject disclosure, after a set number of failed authentications a memory of the device may be wiped clean.

Figure 10:
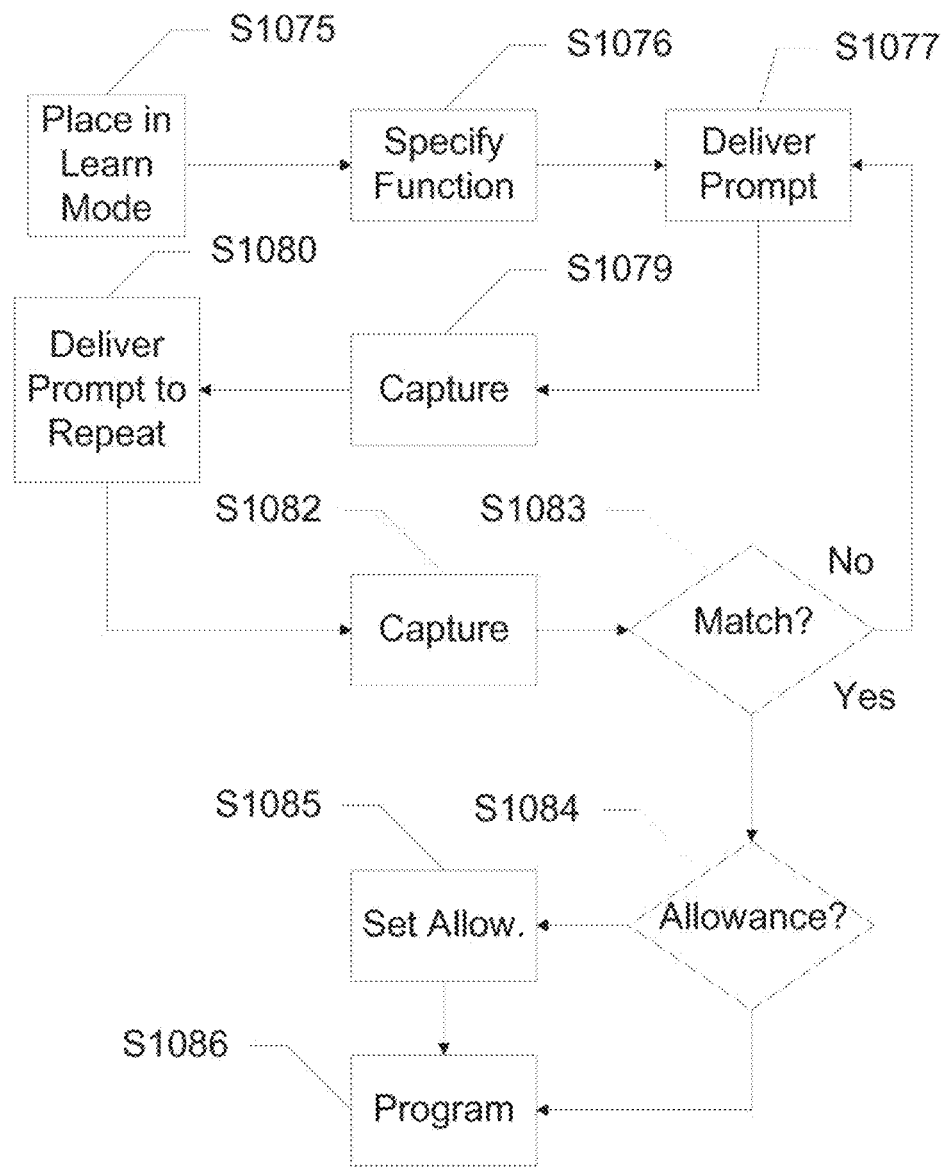
FIG. 10 shows a method of a learning mode for a gesture based authentication, according to an exemplary embodiment of the present subject disclosure.

FIG. 10 shows a method of a learning mode for a gesture based authentication, according to an exemplary embodiment of the present subject disclosure. In this embodiment, a device with an onboard magnetometer captures an electromagnetic signature as the device is gestured around a magnetic source. The method begins by placing the device in a learning mode S1075. This may be accomplished by pressing a button, entering a password, entering a biometric, etc. With the device in learning mode, a function is specified S1076. The function is an application, network, persona, etc. that the authentication allows access to. The device then delivers a prompt to begin an authentication gesture S1077. The device is then gestured. The magnetometer of the device captures the electromagnetic signature created by the gesturing of the device around the magnetic source S1079. The device then delivers a second prompt to repeat the gesture S1080. As the device is again gestured, the magnetometer again captures the electromagnetic signature created S1082. The device then determines whether the electromagnetic signature of the first gesture matches that of the second gesture S1083. If the electromagnetic signatures do not match, then the device delivers a prompt to gesture the device again S1077. If the electromagnetic signatures do match, then the device determines whether an allowance is to be set S1084. This allowance is a threshold for slight variations in the sensing of the electromagnetic signature within which the device is authorized. If an allowance is necessary, or desired, then the allowance is set S1085 and the authorized electromagnetic signature, or series of signatures, is programmed into the device S1086, and associated with the specified function. If an allowance is not necessary or desired, then the authorized electromagnetic signature is programmed into the device 1086, associated with the specified function.

Figure 11:
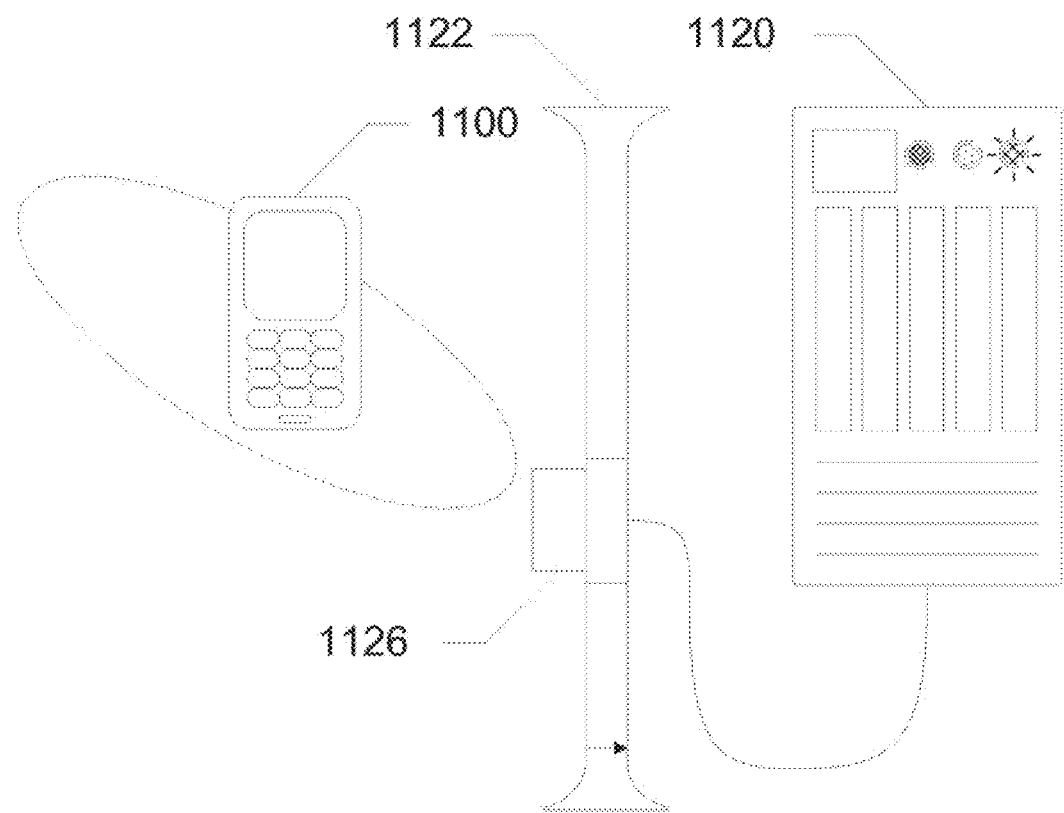
FIG. 11 shows a system for gesture based authentication, according to an exemplary embodiment of the present subject disclosure.

FIG. 11 shows a system for gesture based authentication, according to an exemplary embodiment of the present subject disclosure. In this embodiment, a magnetometer 1126 in communication with an accessible unit 1122 reads the electromagnetic signature of a gesture by a communication device 1100. The system includes communication device 1100, accessible unit 1122, magnetometer 1126, and an authentication server 1120. Communication device 1100 has a unique electromagnetic signature that may be captured by magnetometer 1126. Communication device 1100 may further be gestured to create an even more unique electromagnetic signature. For instance, positioning communication device 1100 at a certain distance from magnetometer 1126 and gesturing communication device 1100 in a circle produces a different electromagnetic signature read by magnetometer 1126 than gesturing communication device 1100 in a square. Thus, the correct key, communication device 1100, and the correct gesture are required, providing a double authentication. Accessible unit 1122 may be any door, barrier, server, etc. that prevents access without proper authentication. Authentication server 1120 includes a memory containing a security logic and a processor. Authentication server 1120 also communicates with accessible unit 1122 to open accessible unit when communication device 1100 is authenticated. Authentication is performed by authentication server 1120 based upon information received from magnetometer 1126. Authentication server 1120 attempts to match the captured electromagnetic signature with authorized electromagnetic signatures saved within the memory of authentication server 1120 or a database in communication with authentication server 1120. This may require using a hash function to find the match. If a match is found, authentication server 1120 sends a signal to accessible unit 1122 to grant access. If a match is not found, access is not granted. Additionally, authentication server 1120 may be in communication with communication device 1100 and prompt communication device 1100 to attempt authentication again.

While a communication device is used for authentication in this embodiment, other embodiments may use any kind of key with a unique electromagnetic signature. For example, any device containing an electronic component produces an electromagnetic signature which may be measured.

Figure 12:
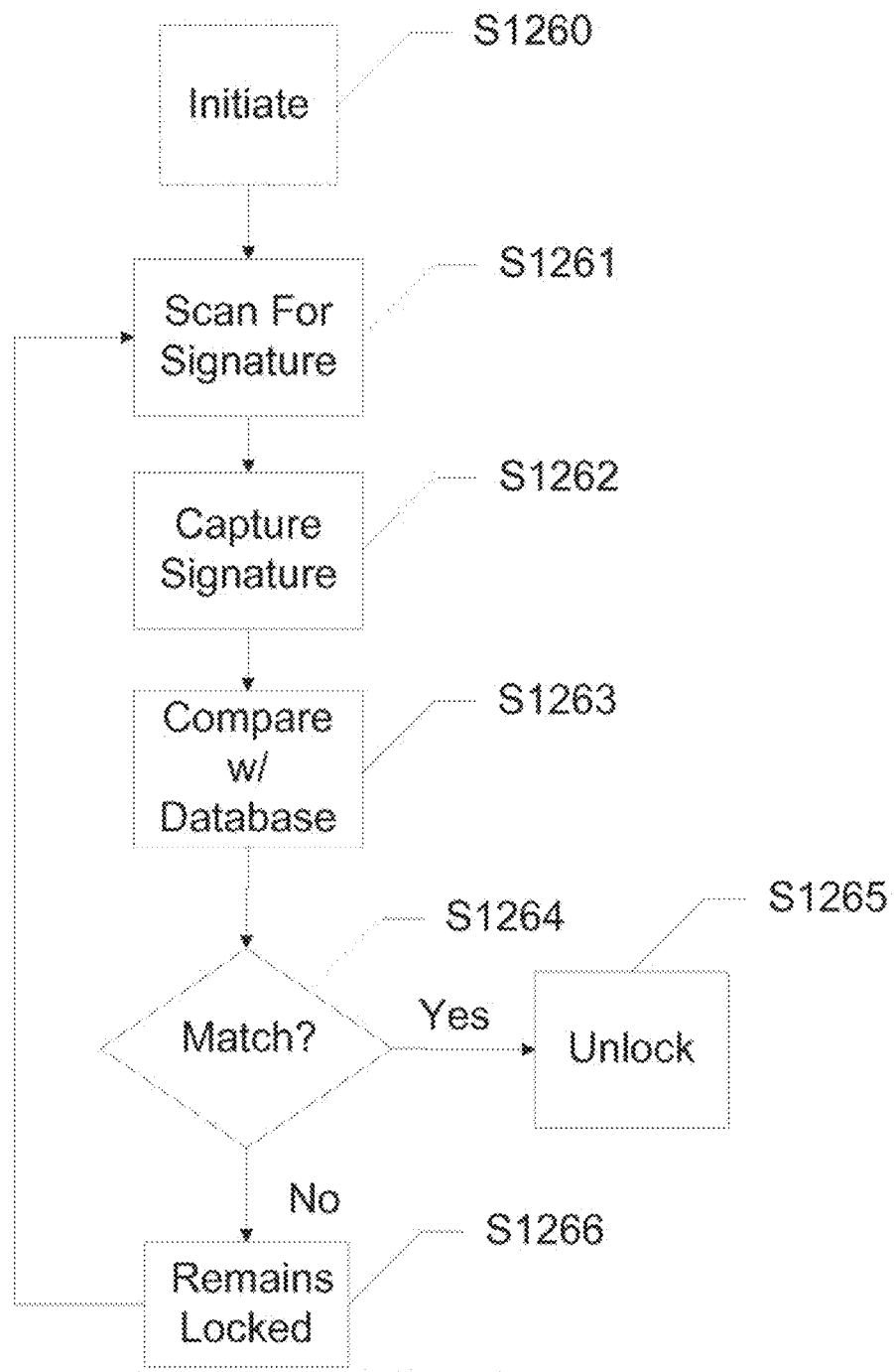
FIG. 12 shows a method for reading an electromagnetic signature from a device, according to an exemplary embodiment of the present subject disclosure.

FIG. 12 shows a method for reading an electromagnetic signature from a device, according to an exemplary embodiment of the present subject disclosure. In this embodiment, an accessible unit includes a magnetometer that reads the electromagnetic signature of a device used for authentication. The accessible unit contains or is in communication with a memory and processor. The memory contains logic for making comparisons between electromagnetic signatures as well as a plurality of authorized electromagnetic signatures. The device is positioned or gestured in proximity of the accessible unit and the magnetometer captures the created electromagnetic signature. The method begins with the authentication initiation S1260. This initiation may occur through a button press, a detected proximity, a received signal, a timer expiration, etc. The magnetometer of the accessible unit scans for an electromagnetic signature S1261. When an electromagnetic signature is detected, the electromagnetic signature is captured by the magnetometer S1262. According to logic on the memory, the processor then compares the captured electromagnetic signature with the authorized electromagnetic signatures on the memory S1263. The processor determines whether there is a match between the captured electromagnetic signature and an authorized electromagnetic signature S1264. If there is a match, access is granted to the accessible unit S1265. This may occur, for instance, by the server causing an actuator on the accessible unit to open the accessible unit, by a network connection being established, etc. If there is not a match, access is not granted to the accessible unit S1266, and the magnetometer scans for a new electromagnetic signature S1261. In embodiments of the present subject disclosure, after a certain number of false electromagnetic signatures is received, access to the accessible unit may be blocked for a time period, may require further authentication in addition to the electromagnetic signature, etc.

Embodiments of the present subject disclosure utilize the electromagnetic field of the human body for authentication. Each human body has a slightly different electromagnetic signature that these embodiments may capture and utilize. The device may require, for instance, a specific user for access to different features on the device. Proximity to different areas of the body may produce different results in the device. This may require training on the part of a new user, building a database which is later used to execute pattern matching. The sensitivity of the magnetometer may allow for more or less complexities of positioning and/or motions of the user.

In exemplary embodiments, a device with a magnetometer detects the unique signatures of the human heart and brain to authenticate a user. Features of the device unlock when the correct user is holding the device. Furthermore, features of the device unlock based upon the user's positioning of the device. For instance, different features unlock as the user repositions the device from the user's pocket to the user's hand. Further features unlock and/or automatically load when the user repositions the device, such as within a close proximity of the user's ear. For example, positioning the device near the user's ear instructs the device to dial a number on the display of the device. When the device is removed from the ear, the call may end, switch to a speakerphone mode, etc. Each different position of the device may provide authentication for a different feature. Because electromagnetic signals from the human body are fairly weak, a means of amplification may be utilized to strengthen these signals.

As different users have different electromagnetic signatures, a device may contain different personas to use based upon the user. For example, when a first user is holding the device, a persona for that first user is accessed on the device. This may contain contacts for the first user, applications for the first user, settings for the first user, etc. When a second user picks up the device, the persona for that second user becomes active. This new persona may have different contacts, different applications, different settings, etc.

Figure 13:
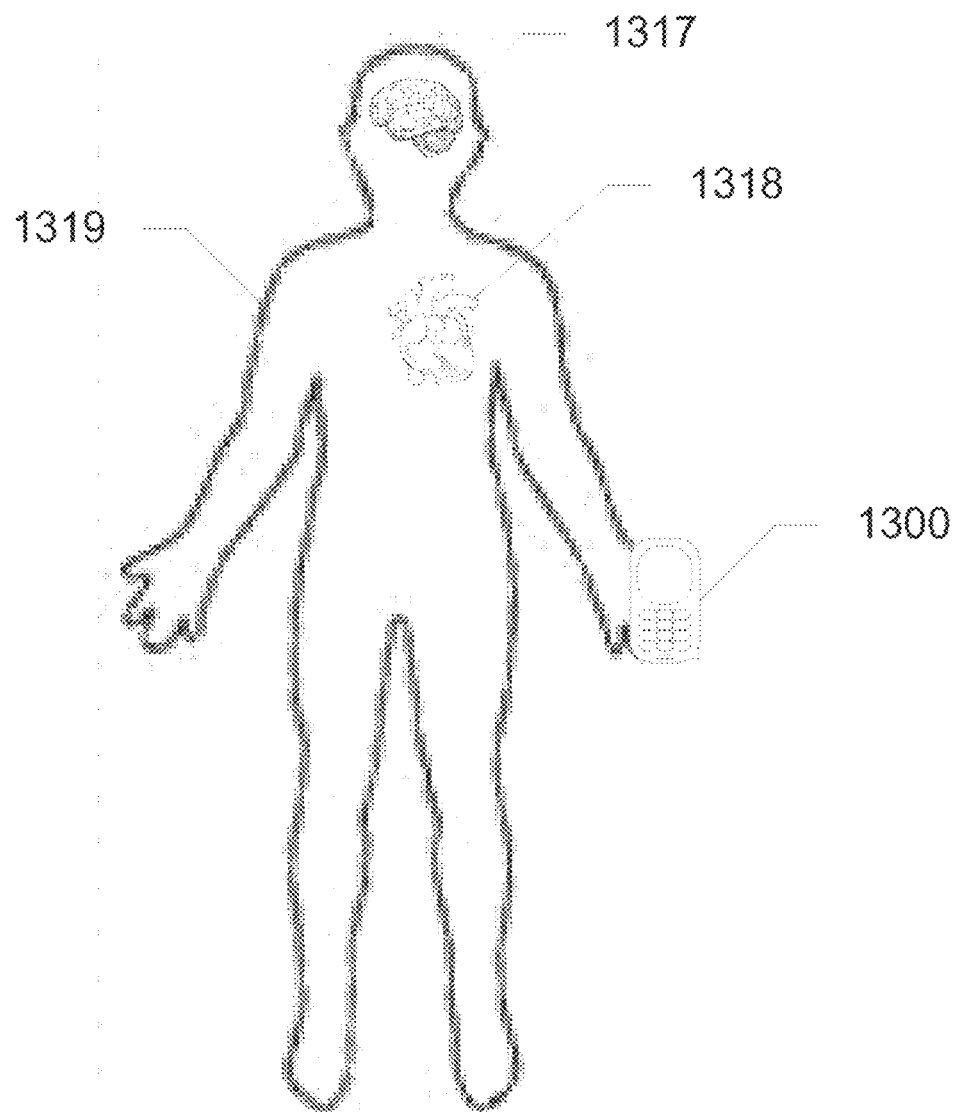
FIG. 13 shows a biometric based authentication, according to an exemplary embodiment of the present subject disclosure.

FIG. 13 shows a biometric based authentication, according to an exemplary embodiment of the present subject disclosure. A human body, such as user 1319 has its own electromagnetic signature. A brain 1317 and a heart 1318 of user 1319 both produce a magnetic field that can be detected by a magnetometer. A device 1300 with a magnetometer may use the unique electromagnetic signature of user 1319 to unlock or otherwise authenticate device 1300 or features of device

1300. For instance, device 1300 can detect that it is approximately located in the pocket of user 1319 based upon the electromagnetic signature received by the magnetometer of device 1300. When device 1300 is in the pocket of user 1319, for instance, logic on device 1300 determines that a keypad of device 1300 remains locked. Device 1300 can similarly detect that it is in the hand of user 1319 based on the different electromagnetic signature. For instance, device 1300 may detect an electromagnetic signature caused by the placement of fingers wrapped around device 1300. When device 1300 is detected to be in the hand of user 1319, logic on device 1300 determines that the keypad of device 1300 may unlock. Additionally, because the electromagnetic signature of user 1319 is different than that of other potential users, device 1300, or features of device 1300, may only unlock when the electromagnetic signature of user 1319 is detected. The logic on device 1300 may specify that only the correct user may use device 1300. Thus, only the unique electromagnetic signature of user 1319 unlocks device 1300 or features of device 1300.

In further embodiments of the subject disclosure, an electromagnetic signature of a human body may be used to unlock an accessible unit. This may require simply the presence of an authorized user, a correct positioning of a user, a correct gesture by the user, etc. For example, the accessible unit may unlock when the user walks up and waves his or her right hand. Alternatively, the user may sign his or her name in the air to unlock the accessible unit. The positioning and gestures made by a user may require the unique electromagnetic signature of an authorized user or may allow for some variation such that any user in the correct positioning or making the correct gestures may unlock the accessible unit. Requiring an authorized user to make a correct gesture provides for a double authentication which adds a level of security to the authorization.

Figure 14:
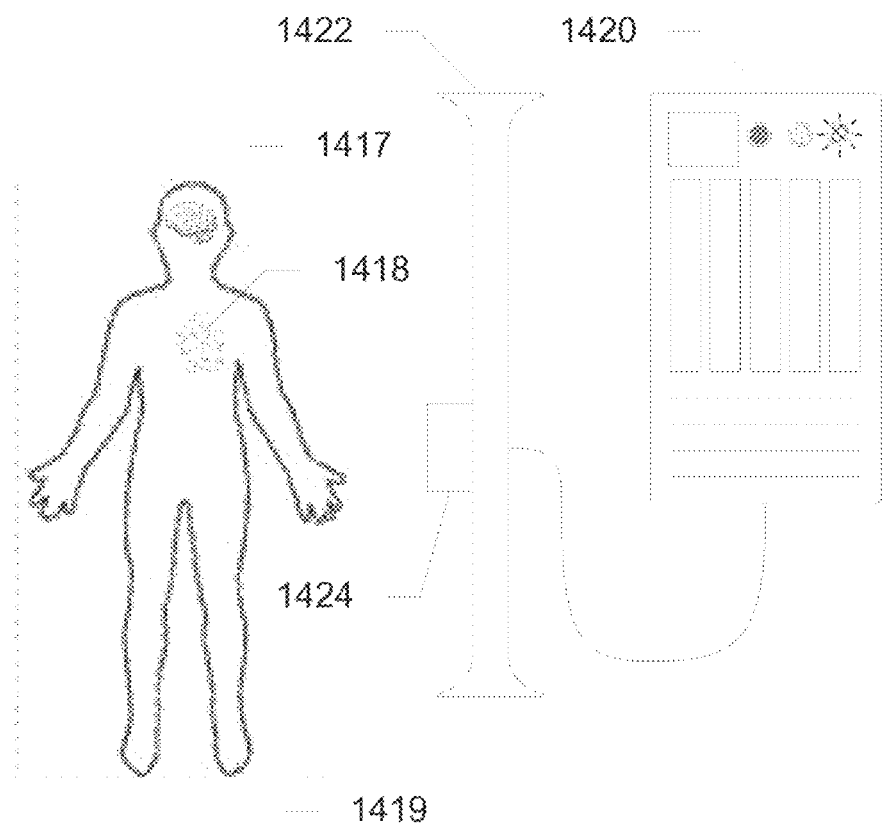
FIG. 14 shows a biometric based authentication, according to an exemplary embodiment of the present subject disclosure.

FIG. 14 shows a biometric based authentication, according to an exemplary embodiment of the present subject disclosure. In this embodiment, the unique electromagnetic signature of a user 1419 is used to authenticate user 1419 to access accessible unit 1422. Similar to FIG. 13, a brain 1417 and a heart 1418 of user 1419 create a unique electromagnetic signature of user 1419. Accessible unit 1422 includes a magnetometer 1424 which detects and captures this electromagnetic signature. A server 1420 with an onboard memory and processor may then compare the electromagnetic signature of user 1419 with authorized electromagnetic signatures. If the detected electromagnetic signature matches an authorized electromagnetic signature, access is granted to accessible unit 1422. If the detected electromagnetic signature does not match an authorized electromagnetic signature, access to accessible unit 1422 remains locked.

In addition to simply detecting the presence of the correct user, authentication may require a gesture by the user. The gesturing by the user may create a different electromagnetic signature than the simple presence of the user and may be used for authentication. For example, authentication may require the user to spin around, waive a hand, stand on one foot, etc. The unique electromagnetic signature captured is compared with a database, with a match to the database providing the authentication.

Figure 15:
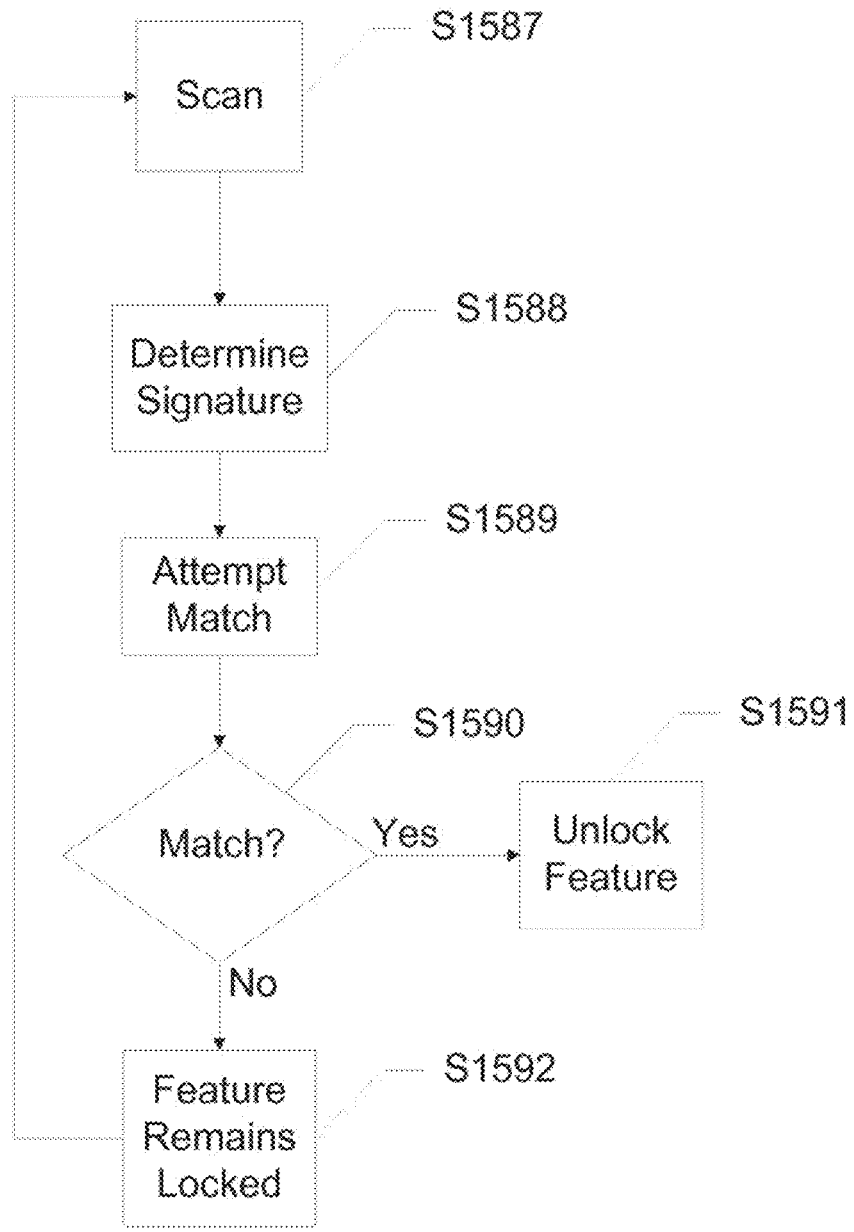
FIG. 15 shows a method of biometric authentication, according to an exemplary embodiment of the present subject disclosure.

FIG. 15 shows a method of biometric authentication, according to an exemplary embodiment of the present subject disclosure. In this embodiment, an electromagnetic signature is captured from a human body to provide authentication. A user is in range of a magnetometer of a device such that an integrated magnetometer in the device captures the electromagnetic signature of the user. Capturing the user's electromagnetic signature may, for instance, allow the device to determine whether the user is authorized, whether the device is in a location of use, etc. A location of use, for instance, may be the detection of a cellular telephone near the ear of the user. The method begins with the magnetometer scanning for an electromagnetic signature S1587. The magnetometer and device determine the electromagnetic signature S1588. This may include screening out certain interferences caused by sources other than the user. The device then attempts to match the determined electromagnetic signature with authorized electromagnetic signatures S1589. It is determined whether a match is found S1590. If a match is found, then the feature associated with the matched electromagnetic signature is unlocked S1591. For instance, if the determined electromagnetic signature matches a stored electromagnetic signature for the device being located in the user's hand, then the screen and keypad are unlocked. If a match is not found, then the locked features of the device remain locked S1592.

Figure 16:
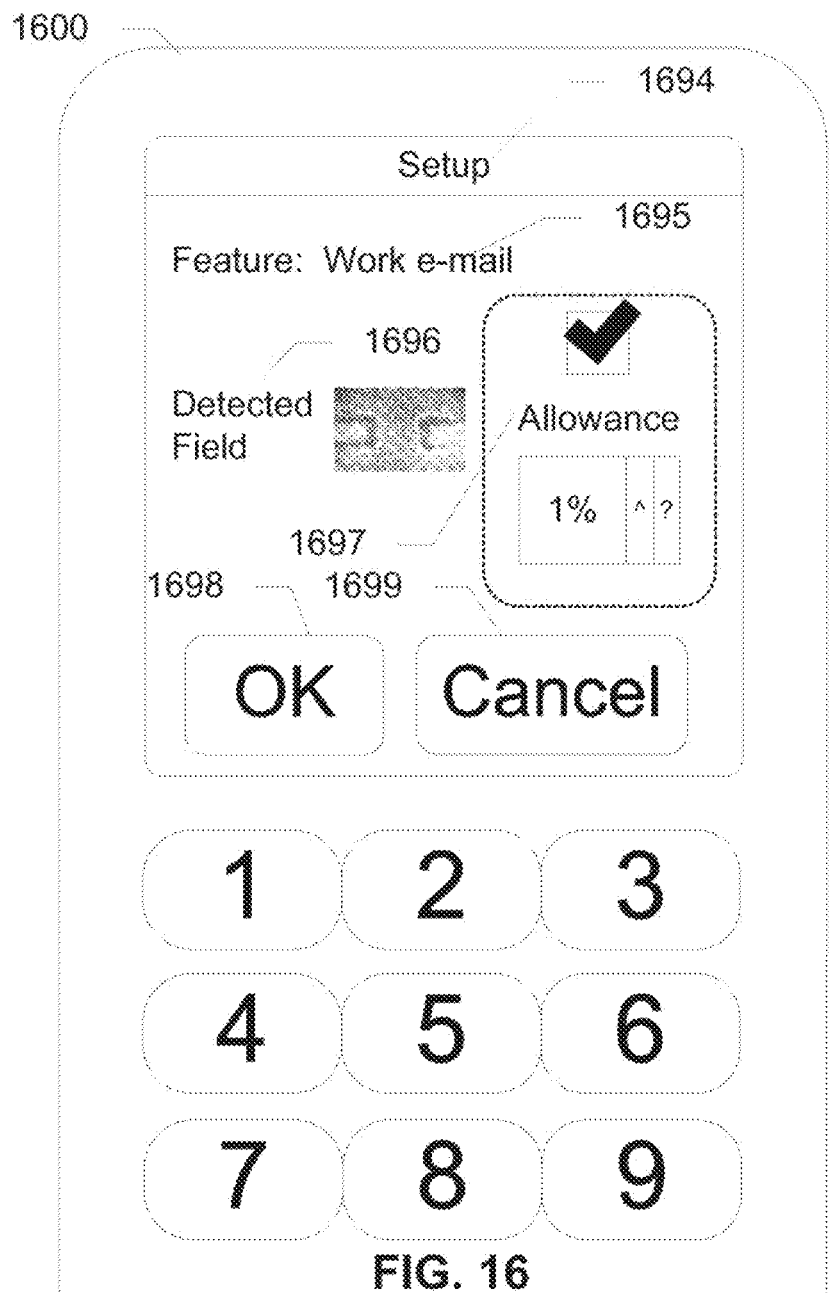
FIG. 16 shows a screenshot of settings for electromagnetic authentication, according to an exemplary embodiment of the present subject disclosure.

FIG. 16 shows a screenshot of settings for electromagnetic authentication, according to an exemplary embodiment of the present subject disclosure. A setup screen 1694 allows a user to program an authentication mechanism for a device 1600. In this embodiment, setup screen 1694 includes a feature 1695, a detected magnetic field 1696, an allowance option 1697, an 'OK' button 1698, and a 'Cancel button' 1699. Feature 1695 allows the user to select a certain application, network, persona, etc., to allow upon authentication. For example, if the user wants to program an authentication mechanism for a work application on device 1600, then the user selects or enters the name of the work application. Detected magnetic field 1696 allows the user to view a representation of a magnetic field's strength, direction, etc., which is being used for authentication purposes. This electromagnetic signature is captured and must be matched to later access the selected feature of device 1600. Allowance option 1697 allows the user to set a threshold for variation from a set electromagnetic signature which is still authorized. For example, it may be desired that a slightly different position in the room is acceptable for the device. Allowance option 1697 provides for this. Once complete, if the user has trouble with authorization, then increasing the allowance may result in easier authorization. OK button 1698 accepts the current settings of setup screen 1694. Cancel button 1699 rejects any changes made on setup screen 1694.

Embodiments of the subject disclosure may enable new features and services beyond that of security and authentication. Embodiments may allow for a larger language of gesture vocabulary for interacting with applications. For example, a gesture in a particular direction may move a pointer, make a selection, etc. These and other features would be readily apparent to one of ordinary skill in the art in light of this disclosure.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A method comprising:
receiving, by an authentication server comprising a processor, an electromagnetic signature created by a communication device when the communication device is gestured, wherein the electromagnetic signature is based on a gesture made by the communication device when the communication device is gestured and is further based on a signature of an electromagnetic field of the communication device; and
attempting, by the authentication server based on the electromagnetic signature, to authenticate the communication device.

2. The method of claim 1, wherein attempting, by the authentication server based on the electromagnetic signature, to authenticate the communication device comprises determining whether the electromagnetic signature matches an authorized electromagnetic signature.

3. The method of claim 2, further comprising in response to determining that first electromagnetic signature matches the authorized electromagnetic signature, granting access to an accessible unit.

4. The method of claim 3, wherein granting access to the accessible unit comprises sending a signal to the accessible unit to grant access.

5. The method of claim 2, further comprising in response to determining a mismatch between the authorized electromagnetic signature and the electromagnetic signature, blocking access to an accessible unit for a period of time.

6. The method of claim 2, further comprising in response to determining a mismatch between the authorized electromagnetic signature and the electromagnetic signature, requiring, from the communication device, another authentication in addition to the electromagnetic signature.

7. The method of claim 2, further comprising in response to determining a mismatch between the authorized electromagnetic signature and the electromagnetic signature, providing, by the authentication server to the communication device, a prompt to attempt authentication again.

8. An authentication server comprising:
a processor; and
a memory storing instructions that, when executed by the processor, cause the processor to perform operations comprising
receiving an electromagnetic signature of a communication device created when the communication device is gestured, wherein the electromagnetic signature is based on a gesture made by the communication device when the communication device is gestured and is further based on a signature of an electromagnetic field of the communication device, and
attempting, based on the first electromagnetic signature, to authenticate the communication device.

9. The authentication server of claim 8, wherein attempting, based on the electromagnetic signature, to authenticate the communication device comprises determining whether the electromagnetic signature matches an authorized electromagnetic signature.

10. The authentication server of claim 9, wherein the operations further comprise in response to determining that electromagnetic signature matches the authorized electromagnetic signature, granting access to an accessible unit.

11. The authentication server of claim 10, wherein granting access to the accessible unit comprises sending a signal to the accessible unit to grant access.

12. The authentication server of claim 9, wherein the operations further comprise in response to determining a mismatch between the authorized electromagnetic signature and the electromagnetic signature, blocking access to an accessible unit for a period of time.

13. The authentication server of claim 9, wherein the operations further comprise in response to determining a mismatch between the authorized electromagnetic signature and the electromagnetic signature, requiring, from the communication device, another authentication in addition to the electromagnetic signature.

14. The authentication server of claim 9, wherein the operations further comprise in response to determining a mismatch between the authorized electromagnetic signature and the electromagnetic signature, providing, to the communication device, a prompt to attempt authentication again.

15. A memory storing instructions that, when executed by a processor, causes the processor to perform operations comprising:
receiving an electromagnetic signature of a communication device created when the communication device is gestured, wherein the electromagnetic signature is based on a gesture made by the communication device when the communication device is gestured and is further based on a signature of an electromagnetic field of the communication device; and
attempting, based on the electromagnetic signature, to authenticate the communication device.

16. The memory of claim 15, wherein attempting, based on the electromagnetic signature, to authenticate the communication device comprises determining whether the electromagnetic signature matches an authorized electromagnetic signature.

17. The memory of claim 16, wherein the operations further comprise in response to determining that electromagnetic signature matches the authorized electromagnetic signature, granting access to an accessible unit.

18. The memory of claim 16, wherein the operations further comprise in response to determining a mismatch between the authorized electromagnetic signature and the electromagnetic signature, blocking access to an accessible unit for a period of time.

19. The memory of claim 16, wherein the operations further comprise in response to determining a mismatch between the authorized electromagnetic signature and the electromagnetic signature, requiring, from the communication device, another authentication in addition to the electromagnetic signature.

20. The memory of claim 16, wherein the operations further comprise in response to determining a mismatch between the authorized electromagnetic signature and the electromagnetic signature, providing, to the communication device, a prompt to attempt authentication again.

* * * * *